United States Patent Office 3,338,864
Patented Aug. 29, 1967

3,338,864
FLAME RETARDANT MONOALKENYL BENZENE POLYMER COMPOSITIONS CONTAINING SILANE PEROXY COMPOUNDS
Orville L. Mageli, Kenmore, Rupert E. Light, Jr., Buffalo, and Ervin J. Varnagy, Williamsville, N.Y., assignors to Wallace and Tiernan, Inc., Buffalo, N.Y., a corporation of Delaware
No Drawing. Filed May 14, 1965, Ser. No. 455,946
17 Claims. (Cl. 260—45.7)

ABSTRACT OF THE DISCLOSURE

A flame retardant composition consisting essentially of a thermoplastic monoalkenylbenzene polymer having 2–4 carbon atoms in the alkenyl group; an organic bromine compound capable of retarding the degree of flammability of said polymer; and silane peroxy compound where the silicon is attached directly to a peroxy oxygen and said peroxy compound has a half-life of at least 2 hours at 100° C.; said bromine compound and said peroxy being intimately dispersed throughout said polymer. Example: A polystyrene including about 0.3–0.5% of trimethyl(t-butylperoxy) silane and about 0.5–1% of tris-(2,3-dibromopropyl) phosphate.

This invention relates to flame retardant polymer compositions and particularly to compositions including polystyrene resin, a bromide compound and an organic peroxide.

For many purposes it is desirable that a polymeric composition have flow flammability and even self-extingushing characteristics. It is known that organic bromide compounds are effective flame retardants. In the case of polystyrene type polymers, a combination of bromide compound and organic peroxide has been found to be better than the bromide compound alone. This combination is disclosed in detail in U.S. Patents No. 3,058,926; 3,058,927; 3,058,928; 3,058,929 and 3,124,557.

Freshly prepared compositions of this type are effective non-flammable materials but storage, especially in locations exposed to moderately elevated temperatures result in a decrease in the flame retarding effectiveness. An even greater problem exists where the composition must be processed at elevated tempertaures as are faced in extrusion processing.

A general object of the invention is a peroxide-bromide polymer composition that maintains reasonable flame retardation after processing and/or storage at moderately elevated temperatures, such as used in extrusion.

Other objects will become apparent in the course of the detailed description of the invention.

It has been discovered that effective flame retardation is present in a polymeric composition consisting essentially of:

(a) thermoplastic monoalkenylbenzene polymer having 2–4 carbon atoms in the alkenyl group;

(b) bromide compound capable of retarding the degree of flammability of said polymer; and (c) silane peroxy compound where the silicon is attached directly to a peroxy oxygen and said peroxy compound has a half life of at least 2 hours at 100° C., with (d) said bromide and said peroxy being intimately dispersed throughout said polymer.

The flame retardant polymer composition of the invention utilizes as the polymer a thermoplastic monoalkenylbenzene polymer having 2–4 carbon atoms in the alkenyl group. Illustrative monomers are vinylbenzene (styrene), vinyltoluene, vinylxylene, alpha methylstyrene, allylbenzene, phenylbutene-1, ar-chlorostyrene and ar-dichlorostyrene. The polymer may be a homopolymer or a copolymer of a number of the defined monoalkenylbenzenes.

The defined polymer may be a copolymer or terpolymer of a major amount of the defined monoalkenylbenzene and other readily polymerizable unsaturated monomers; illustrative of these are methyl methacrylate, ethyl acrylate, divinyl benzene, acrylonitrile, butadiene and isoprene.

The defined polymer includes the high impact materials made by reaction of a monoalkenylbenzene polymer and an elastomer such as natural rubber or synthetic rubber.

It is to be understood "a styrene" is intended to include not only vinylbenzene but also the various compounds having a benzene nucleus substituted with alkyl or cycloalkyl or chloro groups as well as such compounds as alpha methyl styrene. The flame retardant invention is particularly directed to polymers known in the art as polystyrene and modified polystyrene.

It is to be understood that the composition includes not only the named constituents but also materials conventionally added to these polymers such as ultra violet absorbers, anti-oxidants, etc. Also in the case of expandable compositions, the conventional amount of foaming agent will be present. Thus the composition of the invention may be the ordinary dense material, the expandable material and the expanded (foamed) material. The composition can be worked by any of the techniques used for ordinary flammable polymers of this type. The composition is especially suitable for the making of extruded shapes.

The flame retardant composition of the invention utilizes a bromide compound which is capable of retarding the degree of flammability of the polymer, i.e., the bromide must have flame retarding properties in the absence of the silane peroxy compound. The presence of the silane peroxy compound improves the flame retarding beyond that obtainable by either compound alone.

The bromide may be an organic bromide or inorganic bromide, e.g., ammonium bromide. The bromides may include not only bromine but also chlorine.

The organic bromide is an organic bromine containing compound wherein the bromine is attached to the aliphatic, cycloaliphtaic or aromatic portion of the molecule. More desirably the bromide is an aliphatic or cycloaliphatic compound including bromine substituent. It is preferred the bromine be attached to the aliphatic or cycloaliphatic portion of the molecule. For example, phenyl-bromobutane and phenyl-bromocyclohexane.

The especially preferred organic bromide is a bromoalkane having at least about 40% weight part bromine content, e.g., tetrabromoethane.

Examples of suitable organic bromides are:

Carbon tetrabromide,
tetrabromoethylene,
1,2-dibromo-1,1,2,2-tetrachloroethane,
1,1,2,2-tetrabromoethane,
dibromodichloromethane,
1,2-dibromo-1,1-dichloroethane,
1,2-dibromo-1,2,2-tri-chloroethane,
1,2,3,4-tetrabromobutane,
1,2,3-tribromopropane,
pentabromoethane,
tetrabromopentane,
hexabromoethane,
hexabromocyclohexane,
pentabromomonochlorocyclohexane,
tetrabromodichlorocyclohexane,
tribromotrichlorocyclohexane,
1,2-di-(bromomethyl)benzene,
alpha,beta-dibromoethylbenzene, and
tris(2,3-dibromopropyl)phosphate.

The amount of bromide compound present is determined not only by the type of compound and the degree of flame retarding desired but also by the hereinafter defined silane peroxy compound present.

In the case of the organic bromide and more commonly the aliphatic bromine compounds and cycloaliphatic bromine compounds, the bromine compound is present in an amount affording at least about 0.10 weight percent of bromine, based on polymer present, and commonly at least about 0.4 weight percent and desirably about 1%. The upper limit will generally be below about 5%.

The flame retardant composition of the invention includes a silane peroxy compound, where the silicon atom is attached directly to a peroxy oxygen, which compound has a half life in benzene of at least 2 hours at 100° C., and preferably at least about 10 hours.

A preferred group of these silane peroxy compounds is,

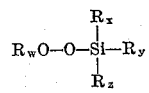

where $R_w$ is a hydrocarbon group, preferably a t-alkyl group where the tertiary carbon atom is attached to a peroxy oxygen; $R_x$, $R_y$, and $R_z$ may be the same or different groups;

(a) hydrocarbon
(b) alkoxy
(c) —OOR$_w$, or
(d) —[(CH$_2$)$_m$SiR$_x$R$_z$(OOR$_w$)]$_n$, $n$ is an integer equal to 1–3 and $m$ is an integer equal to at least 1.

Commonly the hydrocarbon groups will be phenyl, lower alkyl, lower alkenyl, lower alkynyl, and cycloalkyl.

Illustrations of and methods of preparation of the preferred group of silane peroxy compounds are given in U.S. Patent No. 2,997,497, granted Aug. 22, 1961.

An especially preferred class of these silane peroxy compounds is:

[A]—[O—O—Si(R″)$_3$]$_p$ where A is selected from the class consisting of (—CR′$_2$—)$_p$ and —R′$_2$C(—C≡C—)$_r$CR′$_2$—; $p$ is an integer equal to at least 1; $r$ is an integer equal to at least 1; R′ is selected from the class of hydrogen and hydrocarbon; and R″ is selected from the class consisting of aliphatic, cycloaliphatic, aromatic, alkoxy and —O—O—R$_w$ where $R_w$ is a hydrocarbon group, preferably a t-alkyl where the tertiary carbon atom is attached to a peroxy oxygen.

As has been pointed out before, the usage of the silane peroxy compound is related to the bromine compound type and usage. However, in general the preferred silane peroxy compounds are added in an amount of about 0.05–10 weight percent, based on polymer, and more usually about 0.1–5%.

The defined polymer, the defined bromide and the defined silane peroxy compound are brought into a relation where the bromide and silane peroxy are intimately dispersed throughout the body of the polymer. A preferred technique is to add the bromide and silane peroxy compound to the monomer, or mixture of monomers, and have the polymerization proceed in the presence of the flame retardant materials. Because of the reactivity of the silane peroxy compounds with water, this admixing technique is limited to bulk polymerization.

The intimate dispersion may be attained by use of volatile solvents for the flame retardants where the polymer granules are stepped with the solution and then the solvent is evaporated. In the preparation of foamable compositions, the blowing agent may be the solvent.

When the fire retardant composition is used for extrusion purposes, the intimate dispersion may be attained by simple mixing of the polymer granules, the bromide and the silane peroxy compounds and then charging the mixture to the extruder; the extrusion operation produces the desired intimate dispersion in the extrudate.

A preferred composition consists of an intimate dispersion of about 0.5–1% tetrabromoethane, about 0.3–0.5% of trimethyl t-butyl peroxy silane and the remainder vinylbenzene polymer; the dispersion being obtained by bulk polymerization of the referenced ingredients.

Illustrations

The invention is illustrated by a number of silane peroxides. Comparative results with the conventionally used dicumyl peroxide are given. It is to be understood these results are illustrative only and do not limit the scope of the invention.

A. The half life in benzene of nine silane peroxides was determined.

TABLE 1

|  |  | Half-life, Hours | |
|---|---|---|---|
|  |  | 100° C. | 150° C. |
|  | Dicumyl peroxide | 100 |  |
| 1 | Diphenyl-methyl t-butylperoxy silane |  | 14.1 |
| 2 | Dimethyl-chloromethyl t-butylperoxy silane |  | 4.2 |
| 3 | Methyl tris (t-butylperoxy) silane | 311 |  |
| 4 | Tetra t-butylperoxy silane | 115 |  |
| 5 | Trimethyl (t-butylperoxy) silane | 27,000 | 150 |
| 6 | Dimethyl di(t-butylperoxy)silane | 8,900 | 52 |
| 7 | Diphenyl di(t-butylperoxy)silane | 340 | 2.85 |
| 8 | 2,5-dimethyl 2,5-di(trimethyl silylperoxy) hexyne-3 |  | 126 |
| 9 | 2,5-dimethyl 2,5-di(trimethyl silylperoxy)hexane | 7,000 |  |
| 10 | Vinyl tris(t-butylperoxy) silane | 59.2 |  |

B. Silane peroxides were evaluated in polystyrene bulk polymerization, at different levels, together with tetrabromoethane. They were bulkpolymerized at 80° C. for 16 hrs. with 0.43% benzoylperoxide catalyst, then postcured at 100° C. for 4 hrs.

All samples were molded into ½ x 5 x ⅛ inch slabs at 160° C. and 10–15 ton pressure on a 56.2 sq. in. mold. The slabs were marked at 1 and 4 inches and burned under conditions described in A.S.T.M. D–635–56T. Each slab was clamped at a 45° angle, and ignited for 30 secs. Then the flame was removed and the time till flame-out measured. The burning droplets were caught by a 20 mesh bronze screen held ⅜ inch beneath the sample. After flame-out the slabs were reignited two more times. If the sample kept burning, the time was measured till it burned to the 4 inch mark. The burning rate is given in inches per minute.

It is known that 0.4% dicumyl peroxide (Di-Cup) in combination with 0.4% tetrabromoethane (TBE) gives "immediate flameout." All experimental samples are related to this figure by the data after the synergist content referring to the amount of Di-Cup which would have an equal amount of active oxygen.

TABLE 2

| Peroxide | | | TBE Wt. Percent | Self-Extinguishment, Seconds |
|---|---|---|---|---|
| No. | Wt. Percent | Di-Cup Equiv. | | |
| Di-Cup | 0.4 |  | 0.4 | (1) |
| 1 | 0.4 | 0.4 | 0.4 | 8 |
| 2 | 0.3 | 0.4 | 0.4 | 2.3 |
| 3 | 0.15 | 0.4 | 0.4 | 14 |
| 4 | 0.12 | 0.4 | 0.4 | 11 |
| 5 | 0.24 | 0.34 | 0.2 | 6 |
| 5 | 0.24 | 0.34 | 0.4 | 1 |
| 6 | 0.18 | 0.4 | 0.4 | 17 |
| 7 | 0.26 | 0.4 | 0.4 | 15 |
| 8 | 0.20 | 0.36 | 0.2 | (1) |
| 9 | 0.20 | 0.36 | 0.2 | (1) |
| 10 | 0.20 | 0.5 | 0.2 | 6 |

[1] Immediate.

A commercially acceptable flame retardant composition is one which ceases to burn within 20 seconds after having been ignited—this time is for a freshly prepared composition.

The Di-Cup composition had the well-known offensive odor. The compositions of the invention were essentially odorless.

C. Finally to gauge the synergists after prolonged heat history, an "aging" test was devised. The samples were heated at 140° C. for 16 hours before being molded into slabs. The time and temperature were arbitrarily selected so that the maximum amount of heat could be transferred without damaging the polymer structure.

TABLE 3

| Peroxide | | TBE Wt. Percent | Self-Extinguishment, Seconds |
|---|---|---|---|
| No. | Wt. Percent | | |
| Di-Cup | 0.4 | 0.4 | 4 |
| 5 | 0.24 | 0.4 | 1 |
| 6 | 0.18 | 0.4 | 28 |
| 7 | 0.26 | 0.4 | 30 |

D. Test compositions were prepared by mixing 0.4% tetrabromoethane and 0.4% Di-Cup equivalent of silane peroxide with polystyrene granules. These were extruded at 350° F. (176.7° C.) and the extrudates molded into test slabs at 320° F. (160.0° C.).

TABLE 4

| Peroxide No. | Remarks |
|---|---|
| Di-Cup | Burned, 0.9 inch/minute. |
| 6 | Self-extng., 46 seconds. |
| 7 | Self-extng., 200 seconds. |

The severity of this test emphasizes the heat stability of these silane peroxides and their ability to impart flame retardancy after exposure to high temperature.

E. The method of Illustration B was used to evaluate tris (2,3-dibromopropyl)phosphate (T-2,3-P), as the bromine synergist in the flame retardant composition in place of tetrabromoethane. The data obtained using trimethyl(t-butylperoxy)silane (Peroxide No. 5) as the peroxide synergist is set out in Table 5.

TABLE 5

| Peroxide | | T-2, 3-P, Wt. percent | Self-Extinguishment, Seconds |
|---|---|---|---|
| No. | Wt. percent | | |
| 5 | 1.0 | 1.0 | 3.5 |
| 5 | 1.0 | 1.5 | 1.1 |

Thus having described the invention what is claimed is:

1. A flame retardant composition consisting essentially of:
   (a) thermoplastic monoalkenylbenzene polymer having 2–4 carbon atoms in the alkenyl group;
   (b) organic bromide containing compound wherein the bromine is attached to the aliphatic, cycloaliphatic or aromatic portion of the molecule, capable of retarding the degree of flammability of said polymer; and
   (c) silane peroxy compound where the silicon is attached directly to a peroxy oxygen and said peroxy compound has a half life of at least about 10 hours at 100° C. in an amount of about 0.05–10% based on said polymer, said peroxy compound being selected from the class consisting of (I)

$$(R_wOO)SiR_xR_yR_z$$

where $R_w$ is a hydrocarbon group and $R_x$, $R_y$ and $R_z$ are selected from the class consisting of hydrocarbon, alkoxy, —OOR$_w$ and $$—[(CH_2)_mSiR_xR_z(OOR_w)]_n$$

where $n$ is an integer equal to 1–3, $m$ is an integer equal to at least 1 and (II) $[A]—[O—O—Si(R'')_3]_p$ where A is selected from the class consisting of $$—R_2'C(—C{\equiv}C—)_rCR_2'—$$

and $(—CR_2'—)_p$, $p$ is an integer equal to at least 1; $r$ is an integer equal to at least 1; R' is selected from the class consisting of hydrogen and hydrocarbon; and R'' is selected from the class consisting of aliphatic, cycloaliphatic, aromatic, alkoxy and $$(—OOR_w)$$

where $R_w$ is hydrocarbon;
   (d) said bromide and said peroxy being intimately dispersed throughout said polymer.

2. The composition of claim 1 where said monoalkenylbenzene is a styrene.

3. The composition of claim 1 wherein said organic bromide is a bromoalkane having at least about 40 weight percent of bromine content.

4. The composition of claim 1 wherein said silane peroxy compound is:

$$R_wOO—\underset{\underset{R_z}{|}}{\overset{\overset{R_x}{|}}{Si}}—R_y$$

where $R_w$ is a hydrocarbon group and $R_x$, $R_y$, and $R_z$ are selected from the class consisting of hydrocarbon, alkoxy, —OOR$_w$, and —[(CH$_2$)$_m$SiR$_x$R$_y$(OOR$_w$)]$_n$ where $n$ is an integer equal to 1–3 and $m$ is an integer equal to at least 1.

5. The composition of claim 1 wherein said silane peroxy compound is:

$$[A]—[O—O—Si(R'')_3]_p$$

where A is selected from the class $$—R_2'C(—C{\equiv}C—)_rCR_2'—$$

and $(—CR_2'—)_p$, $p$ is an integer equal to at least 1; $r$ is an integer equal to at least 1; R' is selected from the class consisting of hydrogen and hydrocarbon; and R'' is selected from the class consisting of aliphatic, cycloaliphatic, aromatic, alkoxy and $(—OOR_w)$ where $R_w$ is hydrocarbon.

6. A flame retardant composition consisting essentially of:
   (a) thermoplastic styrene polymer;
   (b) bromine substituted compounds selected from the class consisting of aliphatic and cycloaliphatic which compounds are capable of retarding the degree of flammability of said polymer, said bromine compound being present in an amount affording at least about 0.10 weight percent of bromine; and
   (c) silane peroxy compound where the silicon is attached directly to a peroxy oxygen and said peroxy compound has a half life of at least about 10 hours at 100° C. in an amount of about 0.05–10% based on said polymer, said peroxy compound being selected from the class consisting of (I)

$$(R_wOO)SiR_xR_yR_z$$

where $R_w$ is a hydrocarbon group and $R_x$, $R_y$ and $R_z$ are selected from the class consisting of hydrocarbon, alkoxy, —OOR$_w$ and —[(CH$_2$)$_m$SiR$_x$R$_z$(OOR$_w$)]$_n$ where $n$ is an integer equal to 1–3, $m$ is an integer equal to at least 1 and (II)

$$[A]—[O—O—Si(R'')_3]_p$$

where A is selected from the class $$—R_2'C(—C{\equiv}C—)_rCR_2'—$$

and $(—CR_2'—)_p$, $p$ is an integer equal to at least 1; $r$ is an integer equal to at least 1; R' is selected from the class consisting of hydrogen and hydrocarbon; and R'' is selected from the class consisting of aliphatic, cycloaliphatic, aromatic, alkoxy and $$(-OOR_w)$$

where $R_w$ is hydrocarbon; said bromine compound and said peroxy compound being intimately dispersed throughout said polymer.

7. The composition of claim 6 wherein said bromine compound is a bromoalkane having at least about 40% weight of bromine content.

8. The composition of claim 7 wherein said bromine compound is tetrabromoethane.

9. The composition of claim 6 wherein said peroxy compound is dimethyl di(t-butylperoxy) silane.

10. The composition of claim 6 wherein said peroxy compound is diphenyl di(t-butylperoxy) silane.

11. The composition of claim 6 wherein said peroxy compound is vinyl tris(t-butylperoxy) silane.

12. The compound of claim 6 wherein said peroxy compound is 2,5-dimethyl-2,5-di(trimethyl silylperoxy) hexane.

13. The composition of claim 6 wherein said peroxy compound is 2,5-dimethyl-2,5-di(trimethyl silylperoxy) hexyne-3.

14. The composition of claim 6 wherein said peroxy compound amount is about 0.1–5%.

15. The composition of claim 6 wherein said peroxy compound is trimethyl (t-butylperoxy) silane.

16. The composition of claim 6 wherein said bromine compound is tris(2,3-dibromopropyl)phosphate.

17. A flame retardant polymer composition consisting of an intimate dispersion of,
    (i) about 0.5–1% tetrabromoethane,
    (ii) about 0.3–0.5% trimethyl (t-butylperoxy) silane, and
    (iii) the remainder vinylbenzene polymer, said dispersion having been obtained by bulk polymerization of an intimate mixture of said bromoethane, silane and monovinylbenzene monomer.

References Cited

FOREIGN PATENTS 156,673   8/1963   U.S.S.R.

OTHER REFERENCES

Chem. Abstracts, vol. 60, p. 10907 F (abstract of Yurzhenko et al. patent).

DONALD E. CZAJA, *Primary Examiner.*

M. J. WELSH, *Assistant Examiner.*